(12) United States Patent
Osusky et al.

(10) Patent No.: US 11,840,941 B2
(45) Date of Patent: Dec. 12, 2023

(54) ENGINE COMPONENT WITH COOLING ARCHITECTURE

(71) Applicant: GENERAL ELECTRIC COMPANY, Schenectady, NY (US)

(72) Inventors: Lana Maria Osusky, Rexford, NY (US); Gustavo A. Ledezma, Bethlehem, NY (US); Daniel Endecott Osgood, Loveland, OH (US); Gregory Alexander Natsui, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/673,084

(22) Filed: Feb. 16, 2022

(65) Prior Publication Data

US 2023/0258091 A1    Aug. 17, 2023

(51) Int. Cl.
 *F01D 5/18*    (2006.01)

(52) U.S. Cl.
 CPC ............. *F01D 5/187* (2013.01); *F01D 5/186* (2013.01); *F05D 2200/11* (2013.01); *F05D 2200/14* (2013.01); *F05D 2200/212* (2013.01); *F05D 2200/221* (2013.01); *F05D 2260/20* (2013.01); *F05D 2260/202* (2013.01); *F05D 2260/2214* (2013.01)

(58) Field of Classification Search
 None
 See application file for complete search history.

(56) References Cited

U.S. PATENT DOCUMENTS

| | | | |
|---|---|---|---|
| 4,130,160 A | * | 12/1978 | Dziedzic ................. F28F 21/04 432/223 |
| 7,780,414 B1 | | 8/2010 | Liang |
| 7,866,377 B2 | | 1/2011 | Slaughter |
| 8,241,004 B2 | | 8/2012 | Strother |
| 8,591,189 B2 | | 11/2013 | Correia et al. |
| 10,174,622 B2 | | 1/2019 | Zhang et al. |
| 10,400,625 B2 | | 9/2019 | Cortequisse |
| 10,570,746 B2 | | 2/2020 | Mongillo et al. |

(Continued)

FOREIGN PATENT DOCUMENTS

| | | | |
|---|---|---|---|
| DE | 102017207028 A1 | * | 10/2018 |
| WO | 2020122886 A1 | | 6/2020 |

OTHER PUBLICATIONS

English machine translation of WO 2016/134974A1, Sep. 9, 2022.*
English machine translation of WO 2016/135026A1, Sep. 9, 2022.*

*Primary Examiner* — Christopher Verdier
(74) *Attorney, Agent, or Firm* — McGarry Bair PC

(57) ABSTRACT

An engine component for a gas turbine engine, the engine component comprising a cooling architecture comprising at least one unit cell having a set of walls with a thickness, the set of walls defining fluidly separate conduits having multiple openings, each of the multiple openings having a hydraulic diameter; wherein the thickness (t) and the hydraulic diameter ($D_H$) relate to each other by an equation:

$$\frac{(D_H + 2t)^2}{((D_H + 2t)/D_H)^{1/3}}$$

to define a performance area factor (PAF).

18 Claims, 9 Drawing Sheets

(56) References Cited

U.S. PATENT DOCUMENTS

| | | |
|---|---|---|
| 10,662,781 B2 | 5/2020 | Mongillo et al. |
| 10,731,473 B2 | 8/2020 | Sayder et al. |
| 10,982,553 B2 | 4/2021 | Rathay et al. |
| 2015/0345304 A1* | 12/2015 | Mongillo .................. F02C 7/18 29/889.721 |

* cited by examiner

ENGINE COMPONENT WITH COOLING ARCHITECTURE

TECHNICAL FIELD

The present subject matter relates generally to an engine component having a cooling architecture for cooling the engine component located in a turbine engine.

BACKGROUND

A gas turbine engine typically includes a fan and a turbomachine. The turbomachine generally includes an inlet, one or more compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as for producing useful work to propel an aircraft in flight or to power a load, such as an electrical generator.

During operation of the gas turbine engine various systems may generate a relatively large amount of heat. For example, a substantial amount of heat may be generated during operation of the thrust generating systems, lubrication systems, electric motors and/or generators, hydraulic systems or other systems. Accordingly, a cooling structure within the engine components located in the various systems would be advantageous in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
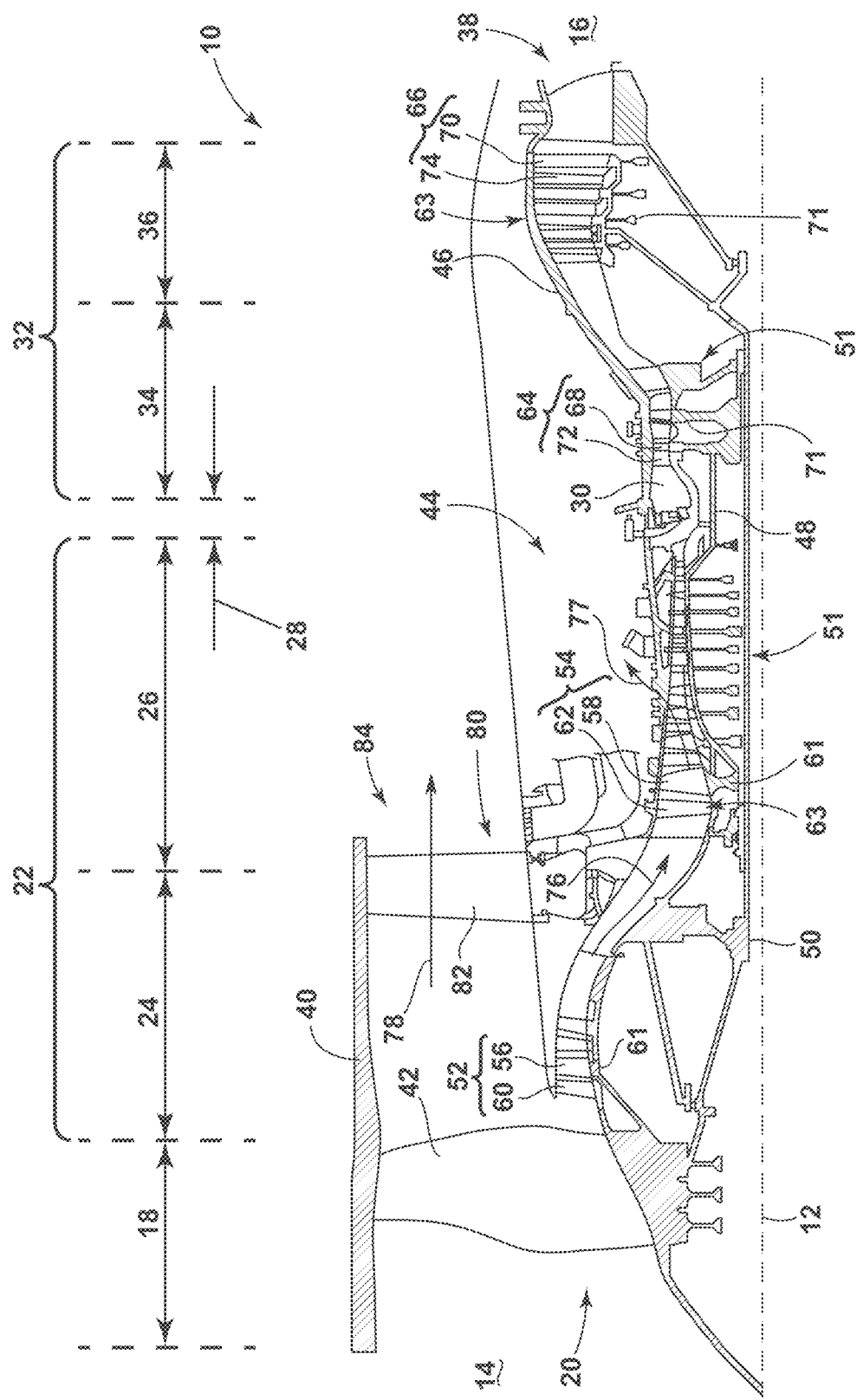
FIG. 1 is a schematic cross-sectional view of a gas turbine engine in accordance with an exemplary embodiment of the present disclosure.

Aspects of the disclosure herein are directed to a cooling architecture located within an engine component, and more specifically to a unit cell where a performance of the unit cell is a function of geometry parameters that drive heat transfer and pressure drop. For purposes of illustration, the present disclosure will be described with respect to the unit cells located within a turbine blade of a turbine for an aircraft gas turbine engine. It will be understood, however, that aspects of the disclosure herein are not so limited and may have general applicability within an engine, including compressors, as well as in non-aircraft applications, such as other mobile applications and non-mobile industrial, commercial, and residential applications.

Reference will now be made in detail to the cooling architecture, and in particular the unit cell, located within a turbine blade, one or more examples of which are illustrated in the accompanying drawings. The detailed description uses numerical and letter designations to refer to features in the drawings.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid, or multi-phase. The term "fluid communication" means that a fluid is capable of making the connection between the areas specified.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Substantially annular" with respect to a duct or flow path, such as a duct or flow path with a heat exchanger positioned therein, refers to a duct or flow path that is fully annular (i.e., extends continuously and uninterrupted in a circumferential direction with the exception of only the heat exchanger), or partially annular with at least 50% volume percent of void with the exception of the heat exchanger (such as at least 60%, such as at least 70%, such as at least 80%, such as at least 90% volume percent of void with the exception of the heat exchanger).

"Substrate" as used herein refers to any wall of an engine component.

Figure 4:
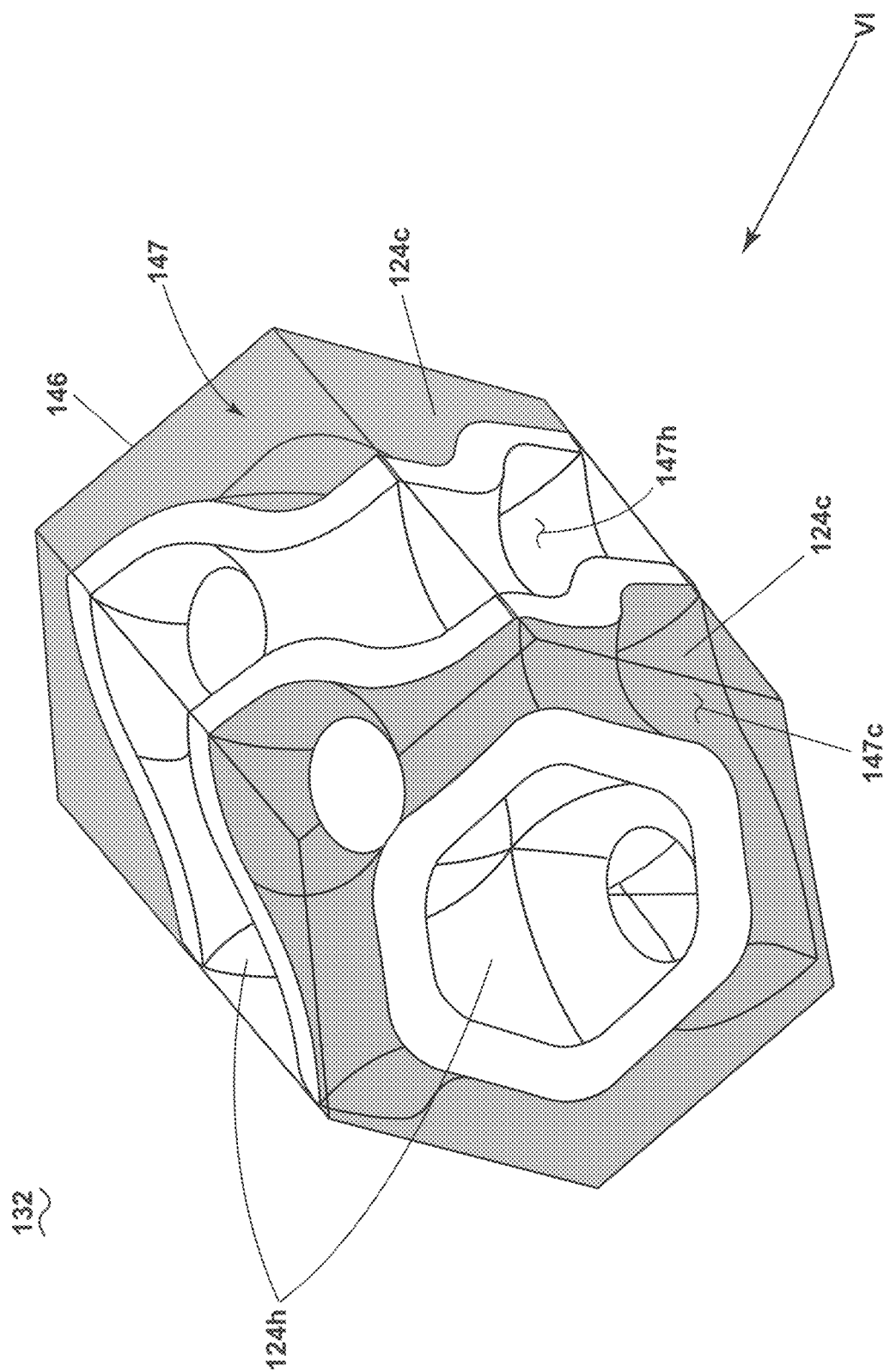
FIG. 4 is an enlarged view of the at least one unit cell from FIG. 3.
Figure 5:
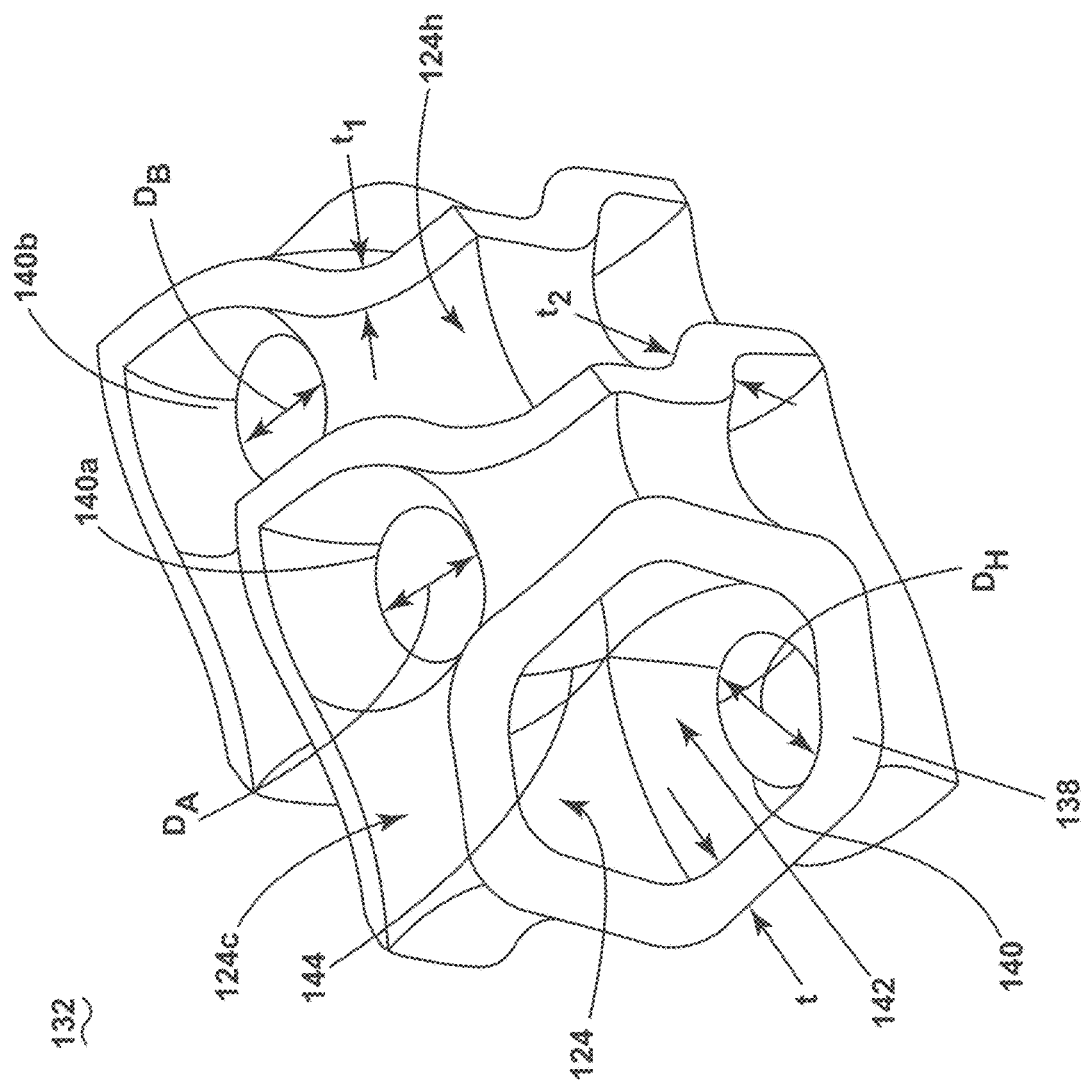
FIG. 5 is the at least one unit cell from FIG. 4 including a unit cell outline.

"Unit Cell" as used herein is a block of conduits connected by openings and formed from walls. Each unit cell is defined by a geometry of both a thickness ($t_{uc}$) of the walls and a hydraulic diameter ($D_H$) of the openings within the unit cell. FIG. 4 and FIG. 5 are both representative illustrations of a unit cell.

"Thickness" ($t_{uc}$) as used herein is in reference to a thickness of the walls defining the unit cell.

"Diameter" ($D_H$) as used herein is in reference to a hydraulic diameter of the openings within the unit cell. Hydraulic diameter is a commonly used term when handling flow in non-circular tubes and channels. When the cross-section is uniform along the tube or channel length, it is defined as $$D_H = \frac{4a}{p}$$

where "a" is the cross-sectional area of the flow and "p" is the wetted perimeter of the cross-section.

"High" and "Low" as used herein are descriptors with regards to the performance indicator quantities described herein.

"PAF" as used herein is in reference to a performance area factor. While units associated with the PAF herein are $mm^2$, it should be understood that any units describing a surface area are contemplated. While the units describe an area, the PAF represents a combined impact of heat transfer and pressure drop. In other words, a high heat transfer and/or low pressure drop will contribute to a higher PAF value, while a low heat transfer and/or high pressure drop will contribute to a lower PAF value. The PAF enables an assessment of trade-off impacts when accepting a higher pressure drop for a cooling architecture in return for more heat transfer.

"Pressure drop" across an obstacle refers to the change in fluid pressure that occurs when the fluid passes through the obstacle. A pressure drop means the fluid's static pressure immediately upstream of the obstacle minus the fluid's static pressure immediately downstream of the obstacle over the fluid's static pressure immediately upstream of the obstacle, and is expressed as a percentage.

"Heat transfer area" (HTA) as used herein refers to an amount of available surface area in contact with the fluids where convective heat transfer takes place for the geometry of the unit cell. Generally, maximizing the HTA value is desirable as a higher HTA value is associated with more heat transfer.

"An amount of pressure drop" ($F_p$) as used herein refers to a proportional indicator of the influence of friction on pressure drop across the unit cell described herein.

In certain exemplary embodiments of the present disclosure, a gas turbine engine defining a centerline and a circumferential direction is provided. The gas turbine engine may generally include a turbomachine and a rotor assembly. The rotor assembly may be driven by the turbomachine. The turbomachine, the rotor assembly, or both may define a substantially annular flow path relative to the centerline of the gas turbine engine. The gas turbine engine includes an airfoil, by way of non-limiting example a turbine blade positioned within the flow path, with at least one unit cell provided within. The airfoil described herein can be a plurality of airfoils provided circumferentially about the centerline or be partially provided about a portion of the centerline.

The at least one unit cell design for the airfoil can be designed for various flight conditions, including take off, descent, and idle. The objective, when designing an airfoil, can be generally stated as satisfying a minimum heat transfer capability from a hot fluid to a cold fluid for an acceptable amount of pressure drop across the airfoil. Key factors to consider include the available volume and associated geometrical constraints for the at least one unit cell design, the maximum pressure that the unit cell walls must withstand, and the operational limits of the engine component.

The inventors' practice has proceeded in the manner of designing an airfoil, modifying the airfoil with the addition of at least one unit cell, and redesigning the airfoil with the at least one unit cell to meet heat transfer and pressure drop requirements, then calculating and checking the amount of heat transfer and pressure drop, and repeating the process, etc. during the design of several different types of turbomachines, such as those shown in FIG. 1.

FIG. 1 is a schematic cross-sectional diagram of a gas turbine engine 10 for an aircraft. The engine 10 has a generally longitudinally extending axis or engine centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form a core 44 of the engine 10, which generates combustion gases. The core 44 is surrounded by a core casing 46, which can be coupled with the fan casing 40.

A HP shaft or spool 48 disposed coaxially about the engine centerline 12 of the engine 10 drivingly connects the HP turbine 34 to the HP compressor 26. A LP shaft or spool 50, which is disposed coaxially about the engine centerline 12 of the engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The blades 56, 58 may be part of a blisk, rather than being mounted to a disk. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complimentary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering and exiting the combustor 30 is significantly increased. As such, cooling provided by the bleed air 77 is supplied to downstream turbine components (e.g., a blade 68) subjected to the heightened temperature environments.

A remaining portion of the airflow exiting the fan section, a bypass airflow 78 bypasses the LP compressor 24 and engine core 44 and exits the engine assembly 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the bypass airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
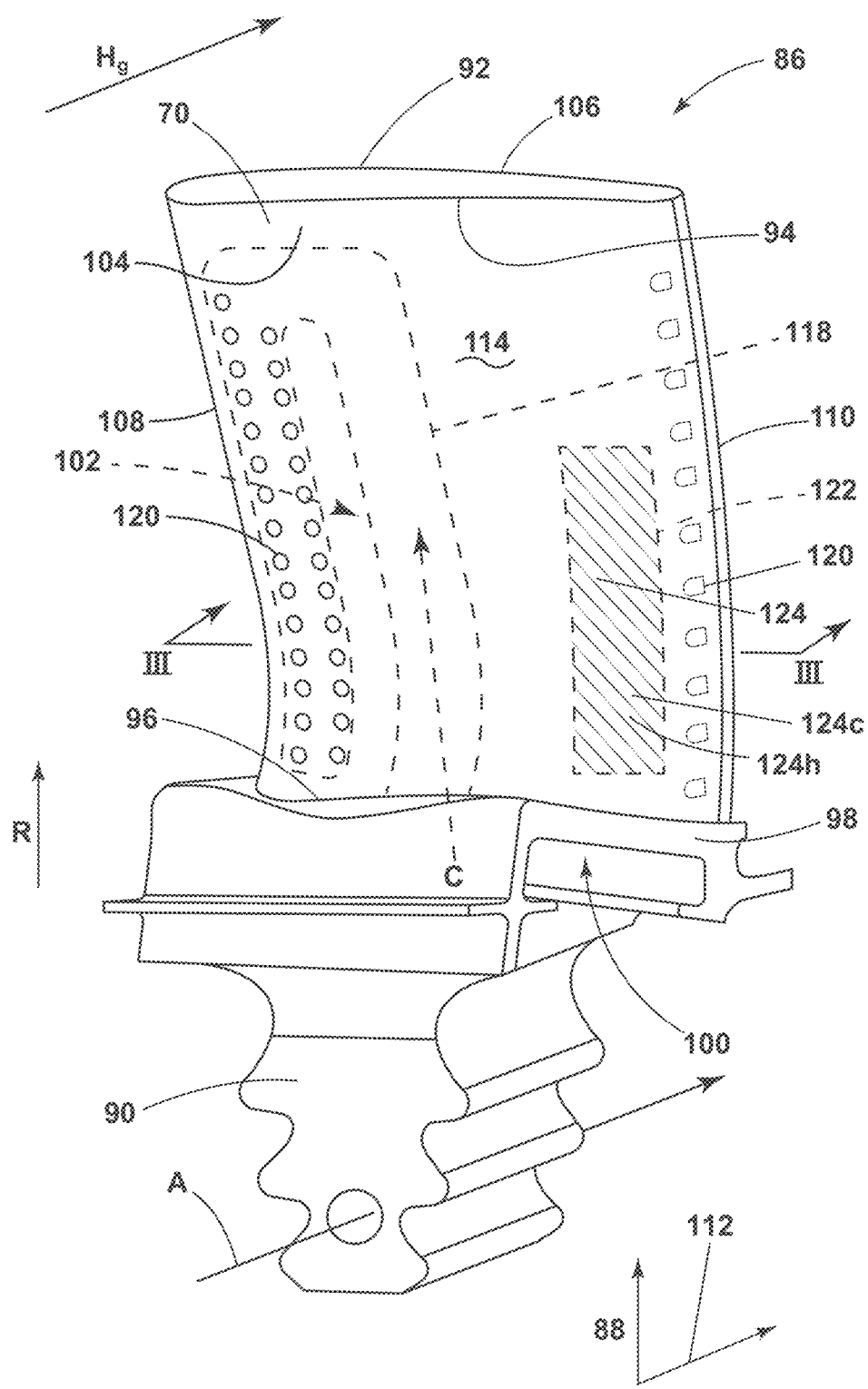
FIG. 2 is a perspective view of an engine component in the form of a turbine blade assembly with a turbine blade of the gas turbine engine from FIG. 1.

FIG. 2 is a perspective view of an engine component in the form of a turbine blade assembly 86 with a turbine blade 70 of the engine 10 from FIG. 1. Alternatively, the engine component can be a vane, a strut, a service tube, a shroud, or a combustion liner in non-limiting examples, or any other engine component that can require or utilize cooling architecture.

The turbine blade assembly 86 includes a dovetail 90 and an airfoil 92. The airfoil 92 extends between a tip 94 and a root 96 to define a span-wise direction 88. The airfoil 92 mounts to the dovetail 90 on a platform 98 at the root 96. When multiple airfoils are circumferentially arranged in side-by-side relationship, the platform 98 helps to radially contain the turbine engine mainstream air flow and forms the radially inner wall of an annulus through which the air flows. The dovetail 90 can be configured to mount to the turbine rotor disk 71 on the engine 10. The dovetail 90 is oriented to mount to the turbine rotor disk 71 along an axial direction (A). The dovetail 90 further includes at least one inlet passage 100 extending through the dovetail 90 to provide internal fluid communication with the airfoil 92.

The airfoil 92 includes a first side 104, illustrated as a concave-shaped pressure side 104, and a second side 106, illustrated as a convex-shaped suction side, the first and second sides 104, 106 joined together to define an airfoil cross-sectional shape of the airfoil 92. The airfoil 92 extends between an upstream edge 108, or a leading edge as illustrated, and a downstream edge 110, or a trailing edge as illustrated, to define a chord-wise direction 112. An outer periphery of the airfoil 92 is bound by an outer wall 114, which also defines the first and second sides 104, 106. The outer wall 114 can face a hot gas flow ($H_g$). An interior 102 of the airfoil 92 can include at least one cooling supply conduit 118, illustrated in dashed line. The at least one cooling supply conduit 118 can be fluidly coupled with the inlet passage 100. A cooling fluid flow (C) can be supplied from the at least one cooling supply conduit 118. At least one cooling hole 120 can be located along any portion of the outer wall 114 including along the upstream edge 108 and downstream edge 110 as illustrated.

The at least one cooling hole 120 can pass through a substrate, which by way of illustration is outer wall 114. It should be understood, however, that the substrate can be any wall within the engine 10 including but not limited to interior walls, a tip wall, or a combustion liner wall.

A cooling architecture 122 can be disposed within the outer wall 114 and is illustrated by a dashed line representing a removed portion of the outer wall 114. The cooling architecture 122 can include a set of fluidly separate cooling conduits 124 for exchanging heat between fluid flow within the conduits 124. Every other conduit 124 can be fluidly connected such that a first set of conduits 124c is a relatively cooler layer than a second set of conduits 124h.

An axial direction (A), extends generally into the page. The axial direction (A) is parallel to the engine centerline 12 (FIG. 1). A radial direction (R) extends perpendicularly away from the axial direction (A). It should be understood that the span-wise direction 88 is parallel to the radial direction (R). The chord-wise direction 112 extends both into the page and across the page from left to right.

Materials used to form the substrate and the cooling architecture can include, but are not limited to, steel, refractory metals such as titanium, or superalloys based on nickel, cobalt, or iron, and ceramic matrix composites. The substrate and cooling architecture can be formed by a variety of methods, including additive manufacturing, casting, electroforming, or direct metal laser melting, in non-limiting examples. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic, ceramic, or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. It is also contemplated that a process utilized could include printing a negative of the part, either by a refractory metal, ceramic, or printing a plastic, and then using that negative to cast the component.

Figure 3:
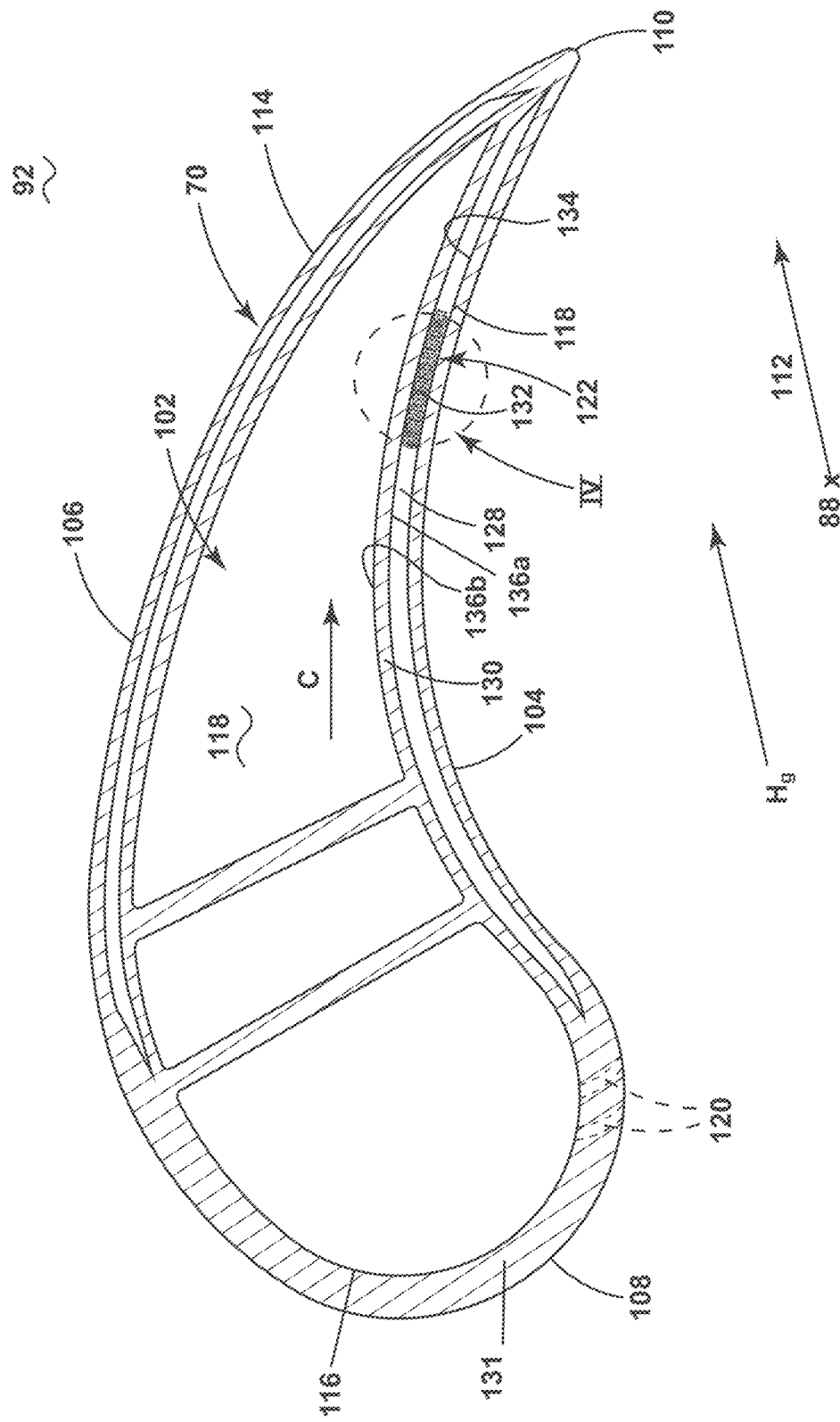
FIG. 3 is a cross-section taken along line III-III of FIG. 2 showing a wall gap with at least one unit cell disposed therein.

FIG. 3 is a cross-section taken along line III-III of FIG. 2 that clearly illustrates a wall gap 128. The turbine blade 70 can further include an inner wall 130 located within the interior 102 and spaced from the outer wall 114 to define the wall gap 128. It is contemplated that the inner wall 130 and the outer wall 114 can contact or abut one another to form a solid wall portion 131, as illustrated proximate the upstream edge 108 through which the at least one cooling hole 120 can pass through. Additionally, or alternatively, the inner wall 130 and outer wall 114 can be spaced apart such that the wall gap 128 is maintained around the entire airfoil 92.

The cooling architecture 122 can be an intricate network made up of at least one unit cell 132 illustrated as multiple unit cells 132. The at least one unit cell 132 can extend between the outer wall 114 and the inner wall 130. More specifically the at least one unit cell 132 can extend between an interior surface 134 of the outer wall 114 and a first interior surface 136a of the inner wall 130. A second interior surface 136b of the inner wall 130 can define the at least one cooling supply conduit 118.

FIG. 4 is a single unit cell 132 with a unit cell outline 146 added for clarity. While illustrated as a typical nut shape, or hexagonal prism, it should be understood that any repeating shape including but not limited to a pyramid, cube, triangular prims, etc., is contemplated. The unit cell 132 include fluidly separate conduits 124. A first and second set of fluidly separate conduits 124c, 124h are illustrated with the first set of conduits 124c in darker shading for clarity.

It can more clearly be seen that the first and second sets of fluidly separate conduits 124c, 124h are layered volumes 147 separated by the set of walls 138. The first set of conduits 124c (darker shade) can define a cooling layered volume 147c, whereas the second set of conduits 124h (no shading) can define a heated layered volume 147h.

Turning to FIG. 5 an enlarged view of the single unit cell 132 of FIG. 4 with shading and the unit cell outline 146 removed. The unit cell 132 can include a set of walls 138 separating the fluidly separate conduits 124 into the first and second set of conduits 124c, 124h. The set of walls 138 can define a wall thickness (t). For each unit cell 132, the wall thickness (t) can be constant throughout. The unit cell 132 can include varying wall thickness (t) throughout in which case the wall thickness utilized for calculations described herein would be the average wall thickness (t).

Each conduit 124 can include multiple openings 140 within. The first set of conduits 124c can include, by way of non-limiting example a first opening 140a. The second set of conduits 124h can include, by way of non-limiting example a second opening 140b.

The set of conduits 124 can define a furcated flow path 142 splitting at a junction 144. The furcated flow path 142 can be bifurcated or trifurcated as illustrated. Each of the multiple openings 140 can define a diameter ($D_H$). While illustrated with a circular shape, it should be understood that the multiple openings 140 can have any shape and that the diameter ($D_H$) is a hydraulic diameter. The diameter ($D_A$) for the first opening 140a is equal to the diameter of the other openings. For example, the diameter ($D_A$) of the first opening 140a equals the diameter ($D_B$) of the second opening 140b which in turn equals the diameter ($D_H$) of the exemplary opening 140 and so on. It will be shown herein that a relationship between the thickness (t) of the wall 138 of the unit cell 132 and the diameter ($D_H$) of the openings 140 in the unit cell 132 can be referred to herein as a performance area factor, or simply "PAF". The hydraulic diameter ($D_H$) can vary among the multiple openings 140 in which case the hydraulic diameter ($D_H$) utilized for calculations described herein would be the average hydraulic diameters ($D_H$).

Figure 6:
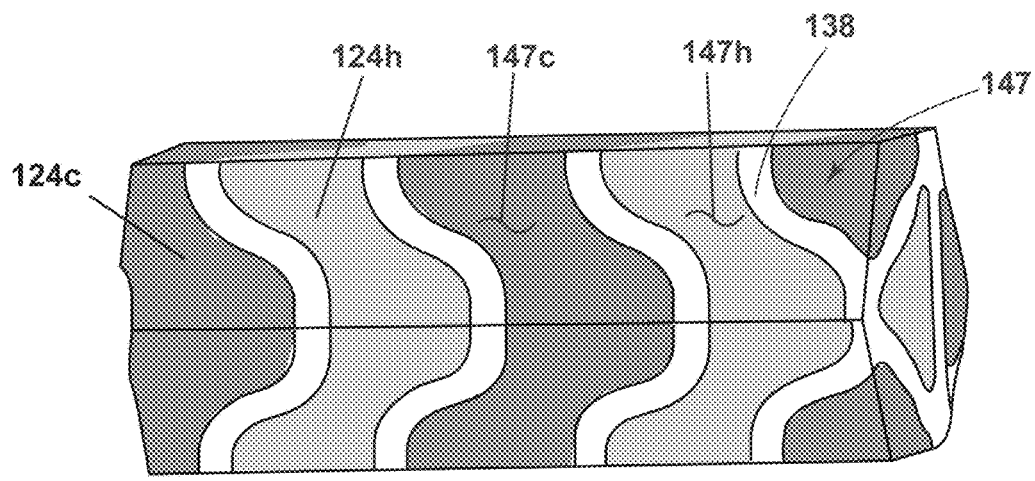
FIG. 6 is a perspective side view of stacked unit cells illustrating a cooling fluid flow through a first set of conduits and a heated fluid flow through a second set of conduits.

Turning to FIG. 6, a view from line VI in FIG. 4 is illustrated of multiple layered unit cells 132. The layered volumes 147 can more clearly be seen as separated by the set of walls 138. The first set of conduits 124c (darker shade) can define the cooling layered volume 147c, whereas the second set of conduits 124h (lighter shade) can define the heated layered volume 147h.

Figure 7:
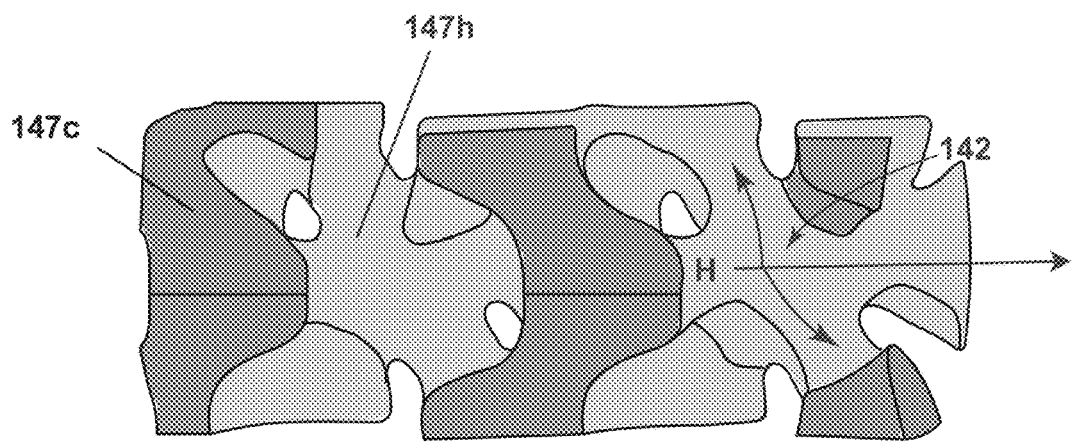
FIG. 7 illustrates a furcated path of the heated fluid flow from FIG. 6.

FIG. 7 illustrates the heated layered volume 147h with the set of walls 138 and a majority of the cooling layered volume 147c removed. This more clearly illustrates the furcated flow path 142 along which a heated fluid (H) can flow. The furcated flow path 142 can be trifurcated as exemplary shown by the arrows. FIG. 7 is a representation of the heated fluid (H) flow without the structure of the unit cell 132.

Figure 8:
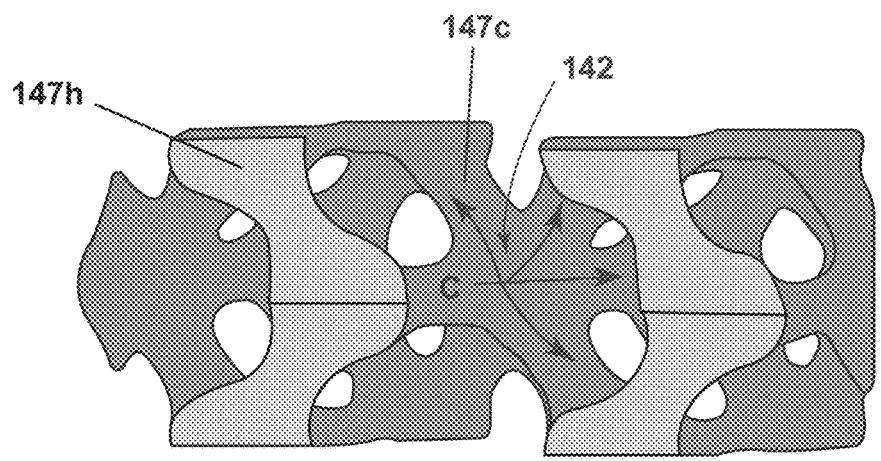
FIG. 8 illustrates a furcated path of the cooling fluid flow from FIG. 6.

FIG. 8 illustrates the cooling layered volume 147c with the set of walls 138 and a majority of the heated layered volume 147h removed. This more clearly illustrates the furcated flow path 142 along which a cooling fluid (C) can flow. The furcated flow path 142 can quadfurcated (four separate fluid paths) as exemplary shown by the arrows. It should be understood that the furcated paths as described herein can be split into more than four separate fluid paths. FIG. 8 is a representation of the cooling fluid (C) flow without the structure of the unit cell 132.

Figure 9:
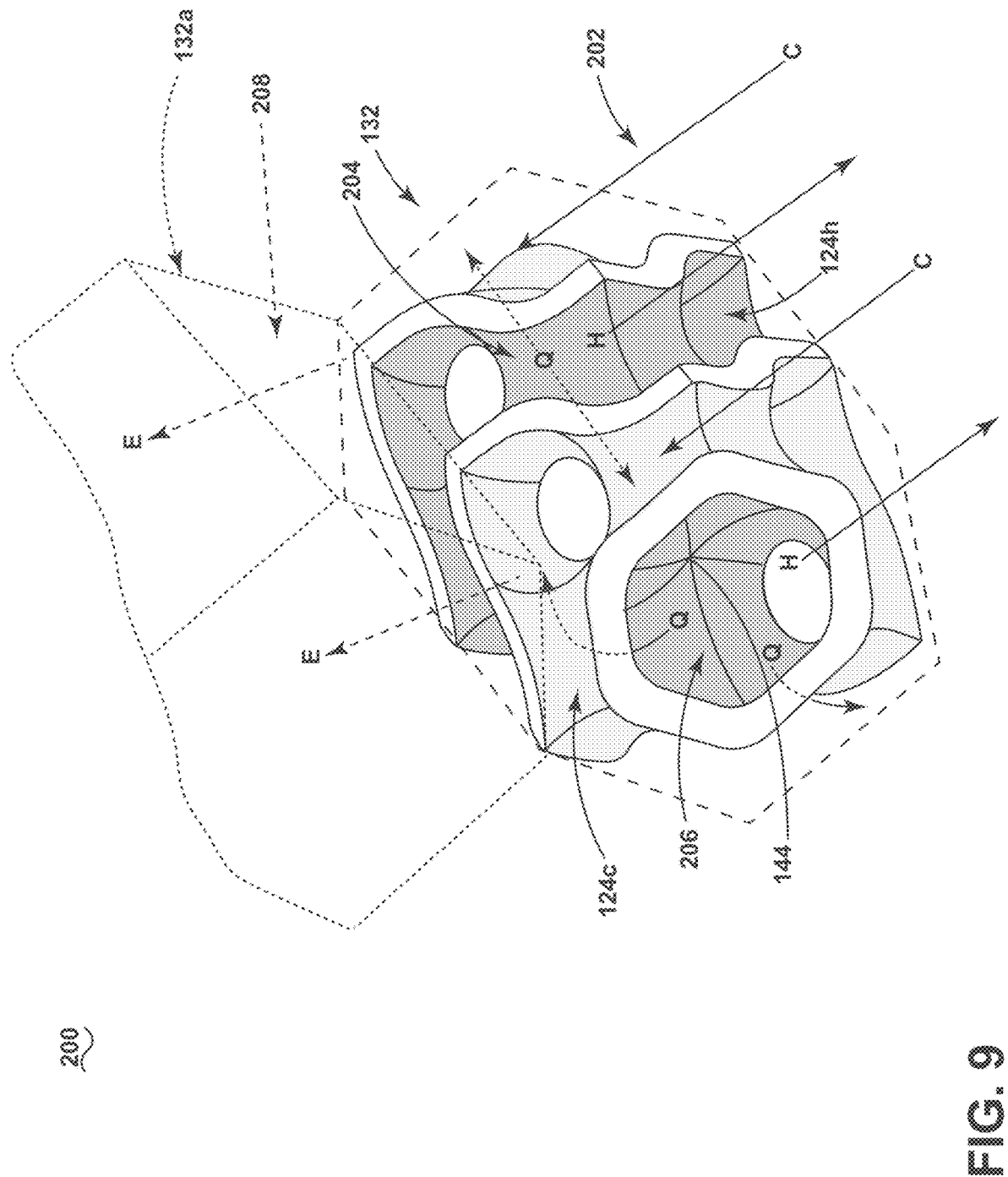
FIG. 9 illustrates a method of cooling an engine component with the at least one unit cell according to a performance area factor (PAF) associated with the at least one unit cell.

Turning to FIG. 9, a method of cooling an engine component with the unit cell 132 according to the performance area factor (PAF) described herein is illustrated. The method 200 can include at 202 introducing the cooling fluid (C) to the first set of conduits 124c. The cooling fluid (C) can be introduced from another unit cell 132a (in dashed line) stacked next to the illustrated unit cell 132 or from the cooling supply conduit 118 (FIG. 3). Stacked unit cells 132, 132a together can define the cooling architecture 122 (FIG. 2). It should be understood that the multiple openings 140 fluidly connect consecutive unit cells 132, 132a to further define the fluidly separate conduits 124c, 124h. The method can include at 204 cooling the second set of cooling conduits 124h by flowing the cooling fluid (C) through the first set of cooling conduits 124c. The cooling fluid (C) is relatively cooler than the heated fluid (H) flowing through the second set of cooling conduits 124h. Therefore heat (Q) can move from the heated fluid (H) to the cooling fluid (C). It should be understood that both fluids can be a cooling fluid flow (C) at any location within the cooling architecture 122 (FIG. 2) depending on the relative temperatures in the surrounding environment. For example, two cooling fluids that are the same fluid, just segregated into the first and second set of cooling conduits 124c, 124h can be used to cool the outer wall 114 facing the hot gas flow (Hg). This is beneficial in that the first and second set of cooling conduits 124c, 124h provide maximized cooling which will keep the outer wall 114 cooled. Further segregating the fluids during cooling enables directed film cooling in designated rows of cooling holes 120, i.e. at the upstream or downstream edges 108, 110 (See FIG. 2).

At 206 the cooling fluid flow (C) can be split at the junction 144. At 208 exhausting the cooling fluid flow (C) can include exhausting the cooling fluid flow (C) as an exhausted fluid flow (E) into another unit cell 132a. It is further contemplated that exhausted fluid flow (E) can exit the airfoil 92 via the at least one cooling hole 120 (see FIGS. 2 and 3) described herein. It should be appreciated that in the event the exhausted fluid (E) is introduced to another unit cell 132a, the method can repeat itself where the exhausted fluid (E) is now the heated fluid (H) for the proximate unit cell 132a.

Figure 10:
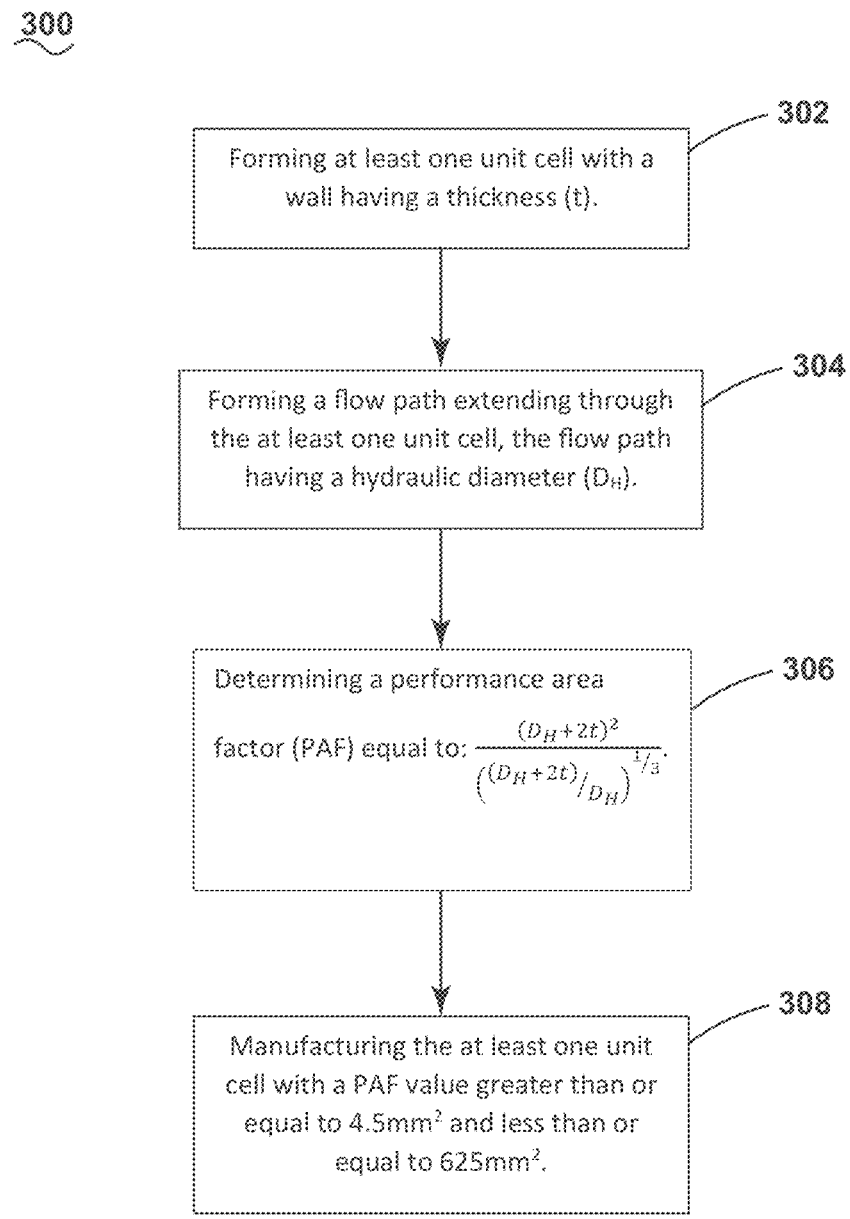
FIG. 10 is a flow chart illustrating a method of forming the engine component described in FIG. 6.

FIG. 10 is a flow chart illustrating a method 300 of forming the engine component described herein can include at block 302 forming the at least one unit cell 132 with the wall 138 having a thickness (t). At block 304 forming a flow path extending through the at least one unit cell, the flow path having the hydraulic diameter ($D_H$). It is contemplated that the flow path is the furcated flow path 142 as described herein. At block 306, the method can include determining a performance area factor (PAF) equal to:

$$\frac{(D_H + 2t)^2}{\left((D_H + 2t)/D_H\right)^{1/3}}.$$

At block 308 the method can include manufacturing the at least one unit cell 132 with a PAF value greater than or equal to 4.5 mm$^2$ and less than or equal to 625 mm$^2$. In some implementations described herein the PAF value is greater than or equal to 4.5 mm$^2$ and less than or equal to 85 mm$^2$.

As will be further discussed herein, the PAF balances an amount of heat transfer area (HTA) and an amount of influence of friction on the amount of pressure drop ($F_p$). The method 300 can further include maximizing the PAF in order to minimize the amount of influence of friction on the amount of pressure drop ($F_p$). It has been found that the denominator of the PAF is proportional to the amount of friction on pressure drop ($F_p$) by equation:

$$F_p \propto \left(\frac{(D_H + 2t)}{D_H}\right)^{1/3}.$$

The method 300 can include maximizing the PAF by manufacturing the at least one unit cell such that the amount of friction on pressure drop ($F_p$) is greater than or equal to 1.0 and less than or equal to 1.5 ($1 \leq F_p \leq 1.5$). In some implementations described herein the amount of friction on pressure drop ($F_p$) is greater than or equal to 1.0 and less than or equal to 1.2 ($1 \leq F_p \leq 1.2$).

It will be appreciated that the number, size, and configuration of the blades, unit cells, etc. are provided by way of example only and that in other exemplary embodiments, the unit cells may have any other suitable configuration.

Optimizing the cooling architecture within the engine component, or the airfoil as described herein is beneficial for optimal heat transfer whilst maintaining a low pressure drop. It has been found that the optimal geometry of each unit cell lies within a specific range based on the diameter ($D_H$) of the openings 140 and the thickness (t) of the set of walls 138. Finding the optimal balance could only previously be completed through trial and error, if at all. This can be a labor and time intensive process because the process is iterative and involves the selection of multiple unit cells 132 with various diameters ($D_H$) and thicknesses (t). Placing said unit cells 132 into an engine component designed for a first flight operating condition and embodying a heat effectiveness with acceptable pressure drop, then evaluating whether in a second, third, or other flight operating condition, the selected unit cell 132 maintains a heat effectiveness with acceptable pressure drop for the other operating conditions, thereby necessitating re-design of the engine component in the event the conditions are not met. It is desirable to have an ability to arrive an optimal engine component, like the airfoil described herein, rather than relying on chance. It would be desirable to have a limited or narrowed range of possible unit cells 132 defined for a cooling architecture 122 satisfying mission requirements, such requirements including heat transfer, pressure ratio, and noise transmission level requirements at the time a cooling architecture 122 is selected and located within an engine.

The inventors discovered during the time-consuming iterative process just described, the relationship between the thickness (t) of the wall 138 of the unit cell 132 and the diameter ($D_H$) of the openings 140 in the unit cell 132. Referred to herein as the performance area factor, or simply "PAF", this relationship was an unexpected discovery during the course of engine design—i.e., designing cooling architectures for engine components and evaluating the impact that the cooling architecture would have on the heat transfer and pressure drop amounts enables a narrowing down of options during the design process which saves time and cuts material costs.

It was found that the PAF balances the desirability of both an amount of heat transfer area (HTA) and an amount of pressure drop, referred to herein as the influence of friction on the amount of pressure drop ($F_p$) and can generally be represented by a ratio of the amount of heat transfer (HTA) to the amount of pressure drop ($F_p$) represented by Equation 1:

$$PAF = \frac{HTA}{F_p} \quad \text{Equation 1}$$

More specifically, it was found that the maximum available heat transfer area (HTA) for the geometry of the unit cell can be represented by Equation 2 below. Generally, maximizing the HTA value is desirable as a higher HTA value is associated with more heat transfer.

$$HTA \propto (D_H + 2t)^2 \quad \text{Equation 2}$$

Additionally, it was found that the influence of friction on the amount of pressure drop ($F_p$) for the geometry of the unit cell can be represented by Equation 3 below. Generally, an $F_p$ value of between 1 and 1.5 is associated with an acceptable pressure drop. More specifically, it has been found that an $F_p$ value greater than 1 and less than or equal to 1.2 ($1 < F_p \leq 1.2$) provides a desirable pressure drop.

$$F_p \propto \left(\frac{(D_H + 2t)}{D_H}\right)^{1/3} \quad \text{Equation 3}$$

Therefore equation 4 below defines the performance area factor:

$$PAF = \frac{(D_H + 2t)^2}{\left(\frac{(D_H + 2t)}{D_H}\right)^{1/3}} \quad \text{Equation 4}$$

Utilizing this relationship, the inventors were able to arrive at a better performing airfoil in terms of heat effectiveness with an acceptable pressure drop. The inventors found that the PAF for a set of unit cells defining a cooling architecture in an engine component that meets both the heat transfer requirements and pressure drop requirements could be narrowed to a PAF range of between 4.5 mm$^2$ and 625 mm$^2$. Narrowing the PAF range provides more insight to the requirements for a given engine well before specific technologies, integration and system requirements are developed fully. Further, knowing a range for the PAF can prevent or minimize late-stage redesign, decrease material cost, and save time.

The PAF value represents a combined impact of heat transfer and pressure drop. A high heat transfer and/or low pressure drop will both/each contribute to higher values of the PAF. Narrowing the PAF range enables assessment during the design phase regarding trade-off impacts of accepting higher amounts of pressure drop in return for more amounts of heat transfer and vice versa. The PAF range relates the combined impact of heat transfer and pressure drop so that a designer can understand the trade-offs involved in sizing a unit cell for a particular set of conditions, which can enable a designer to produce a superior airfoil than what was previously known.

A high HTA value and a relatively low, nearly "1", $F_p$ are desired. The balance and trade-off impact lies somewhere in between. The higher the PAF value, the more desirable the trade-off. For example, as illustrated in TABLE I below, a unit cell 132 having a relatively large thickness (t=10 mm) combined with a relatively small diameter ($D_H$=0.25 mm) may produce a large heat transfer area value (HTA=410), however this also results in a high amount of influence of friction on the amount of pressure drop ($F_p$=4.3), which is undesirable. This combination yields a PAF value of 95 mm$^2$. A designer may want as much heat transfer area as possible while achieving a relatively low pressure drop and can narrow the design down to this possibility by increasing the diameter to 10 mm which is associated with a higher PAF value (624 mm$^2$). The associated heat transfer value increases, which is desirable, while the influence of friction on pressure drop ($F_p$) decreases significantly into the acceptable range (between 1 and 1.5). Therefore, a designer can quickly narrow down desirable geometries simply by choosing relatively high PAF values for the unit cells available with their various thicknesses (t) and/or diameters ($D_H$).

TABLE 1

| Thickness (mm) | Diameter (mm) | PAF (mm$^2$) | HTA (mm$^2$) | $F_p$ |
|---|---|---|---|---|
| 10 | 0.25 | 95 | 410 | 4.3 |
| 10 | 10 | 624 | 900 | 1.4 |

Figure 11:
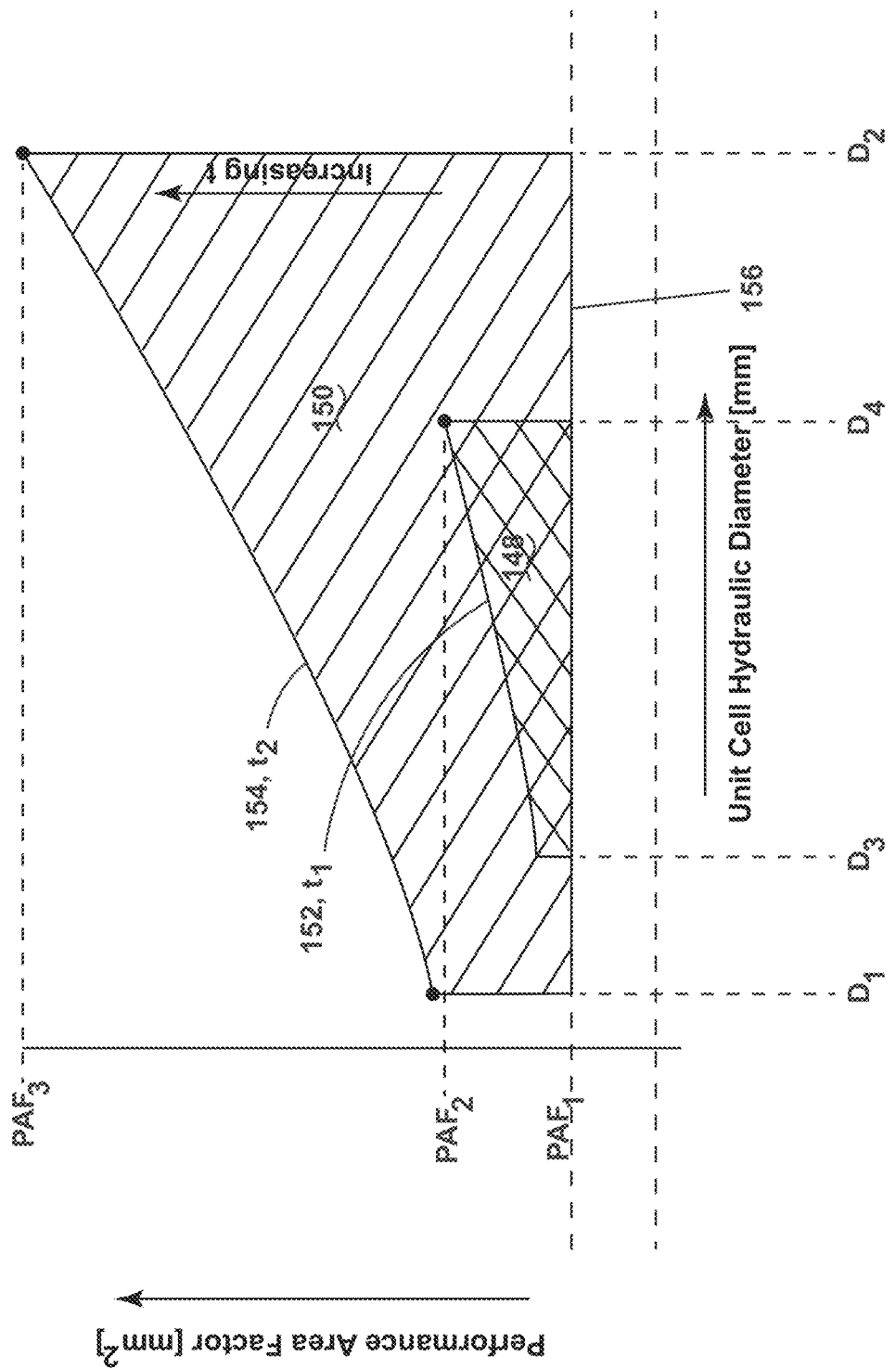
FIG. 11 is a graph of the PAF represented along the y-axis and a diameter ($D_H$) of the at least one unit cell represented along the x-axis.

Turning to FIG. 11, a graph of the PAF represented along the y-axis and the diameter ($D_H$) represented along the x-axis is illustrated. It has been found that a small bounded region 148 and a large bounded region 150 best represent the desired balance described herein, each range dependent on the engine component in which the unit cell 132 described herein is located.

A first maximum thickness ($t_1$) is represented by a first upper bounding line 152 for the small bounded region 148. A second maximum thickness ($t_2$) is represented by a second upper bounding line 154 for the large bounded region 150. The large bounded region 150 extends between a first minimum diameter ($D_1$) and a first maximum diameter ($D_2$).

The small bounded region 148 extends between a second minimum diameter ($D_3$) and a second maximum diameter ($D_4$). The minimum and maximum thickness/diameters result in overlapping PAF values described in more detail later on.

Both the small and large bounded ranges 148, 150 are bound by a minimum performance area factor ($PAF_1$). Two maximum performance area factors are represented in the graph, a first maximum performance area factor ($PAF_2$) for the small bounded region 148 and a second maximum performance area actor ($PAF_3$) for the large bounded region 150. While an acceptable influence of friction on a pressure drop ($F_p$) is between 1 and 1.5, influence of friction on a pressure drop ($F_p$) is most desirably less than or equal to 1.2 (and greater than 1).

Turning to TABLE II, various thicknesses (0.05 mm and 0.4 mm) and diameters (2 mm and 1.5 mm) allow for some amount of heat transfer area (HTA=4.4, 5.3) whilst keeping the influence of friction on a pressure drop ($F_p$=1, 1.2) in the desirable range. It can be seen that increasing the thickness (t=1.3) can contribute to a higher heat transfer area (HTA=9), however the influence of friction on pressure drop increases beyond the acceptable range ($F_p$=1.9). A relatively small thickness range along with a relatively small diameter range equate with a minimum performance area factor ($PAF_1$). The minimum performance area factor is equal to 4.5 mm².

TABLE II

| Thickness (mm) | Diameter (mm) | PAF (mm²) | HTA (mm²) | $F_p$ |
| --- | --- | --- | --- | --- |
| .05 | 2 | 4.5 | 4.4 | 1 |
| .4 | 1.5 | 4.5 | 5.3 | 1.2 |
| 1.3 | .40 | 4.5 | 9 | 1.9 |

Turning to TABLE III, a relatively larger thickness and diameter range are used to calculate a maximum performance area factor ($PAF_2$=85 mm²) for the small bounded region 148. As is illustrated below, an increase in the ranges equates with an increase in the heat transfer while maintaining the influence of friction on a pressure drop ($F_p$=1.1, 1.2) in the desirable range. It can be seen that an increase in thickness (t=2.5) can contribute to a higher heat transfer area (HTA=104), however the influence of friction on pressure drop ($F_p$) increases above the desirable range (1<$F_p$≤1.2) and approaches the acceptable range limit (1<$F_p$<1.5).

TABLE III

| Thickness (mm) | Diameter (mm) | PAF (mm²) | HTA (mm²) | $F_p$ |
| --- | --- | --- | --- | --- |
| 3.2 | 4.3 | 85 | 114 | 1.4 |
| 2 | 6 | 85 | 100 | 1.2 |
| 1.2 | 7.3 | 85 | 94 | 1.1 |

While TABLE I, II, and III illustrate exemplary values, it should be understood that the PAF range as described herein is narrowed to maximize the benefits associated with all variables influencing the structure of the at least one unit cell 132 and in turn the cooling architecture 122.

TABLE IV shows a range of values associated with the first maximum diameter ($D_2$=10 mm) as determined from TABLE I. For the large bounded region 150 (FIG. 11), a list of various thicknesses (t) ranging between 0.05 mm and 10 mm is given. The thickness (t) should not be too thick or the blade is too heavy, the thickness (t) should not be too thin or the structural integrity is compromised and the blade will not be able to withstand the operating conditions, i.e. the pressures, centrifugal forces, and vibrations that the engine component can encounter. As stated previously, a larger thickness (t) generally equates with a larger PAF value and a larger heat transfer area (HTA) value. Beyond a thickness of 4 mm, the influence of friction on pressure drop ($F_p$) increases above the desirable range (1<$F_p$≤1.2) and approaches the acceptable range limit (1<$F_p$<1.5). The PAF balances performance while minimizing weight of the blade and the structural integrity of the blade.

TABLE IV

| Thickness (mm) | Diameter (mm) | PAF (mm²) | HTA (mm²) | $F_p$ |
| --- | --- | --- | --- | --- |
| .05 | 10 | 102 | 102 | 1.0 |
| .08 | 10 | 103 | 103 | 1.0 |
| 1 | 10 | 136 | 144 | 1.1 |
| 1.3 | 10 | 147 | 159 | 1.1 |
| 4 | 10 | 266 | 324 | 1.2 |
| 5 | 10 | 317 | 400 | 1.3 |
| 10 | 10 | 625 | 900 | 1.4 |

TABLE V shows a range of values associated with the second maximum diameter ($D_4$=6 mm) as determined from TABLE II. For the small bounded region 148 (FIG. 11), a list of various thicknesses (t) ranging between 0.05 mm and 10 mm is given. As stated previously, a larger thickness (t) generally equates with a larger PAF value and a larger heat transfer area (HTA) value. It can be seen that beyond a thickness of 2.9 mm, the influence of friction on pressure drop ($F_p$) increases above the desirable range (1<$F_p$≤1.2) and approaches the acceptable range limit (1<$F_p$<1.5).

TABLE V

| Thickness (mm) | Diameter (mm) | PAF (mm²) | HTA (mm²) | $F_p$ |
| --- | --- | --- | --- | --- |
| .05 | 6 | 37 | 37 | 1 |
| .08 | 6 | 38 | 38 | 1 |
| 1 | 6 | 58 | 64 | 1.1 |
| 1.3 | 6 | 66 | 74 | 1.1 |
| 2.9 | 6 | 111 | 139 | 1.3 |
| 5 | 6 | 184 | 256 | 1.4 |
| 10 | 6 | 327 | 676 | 1.6 |

While a high HTA and a low $F_p$ are desired, design constraints including, but not limited to the size of the wall gap 128, can narrow the ranges available for the thickness (t) of the set of walls 138 and the diameter ($D_H$) associated with the unit cell 132 described herein. Utilizing the results described herein, TABLE VI below lists a small range and a large range for the variables (t), ($D_H$), (PAF), and ($F_p$) discussed herein.

TABLE VI

| Variable | Small Range | Large Range |
| --- | --- | --- |
| Thickness (t) | 0.5 mm ≤ t ≤ 2 mm | 0.05 mm ≤ t ≤ 10 mm |
| Diameter ($D_H$) | 0.75 mm ≤ $D_H$ ≤ 6 mm | 0.25 mm ≤ $D_H$ ≤ 10 mm |
| Performance Area Factor (PAF) | 4.5 mm² ≤ PAF ≤ 85 mm² | 4.5 mm² ≤ PAF ≤ 625 mm² |
| Influence of Friction on Pressure Drop (Fp) | 1 < Fp ≤ 1.2 | 1 < Fp ≤ 1.5 |

Further TABLE VII shows a range of values associated with the maxima and minima for each of the thickness/diameter ranges from TABLE VI. It can be seen that for design situations in which the thickness and diameter can be maximized, the influence of friction on pressure drop ($F_p$) can remain within the acceptable range limit (1<$F_p$<1.5) while providing a large heat transfer area (HTA). This is how the maximum PAF value is determined.

TABLE VII

| Thickness (mm) | Diameter (mm) | PAF (mm²) | HTA (mm²) | $F_p$ |
|---|---|---|---|---|
| .05 | 10 | 102 | 102 | 1.0 |
| .5 | 6 | 47 | 49 | 1.1 |
| 2 | .75 | 12.2 | 23 | 1.9 |
| 10 | .25 | 95 | 410 | 4.3 |
| 10 | 10 | 624 | 900 | 1.4 |

Benefits associated with the PAF described herein include a quick visualization of tradeoffs, in terms of HTA and Fp that are bounded by the constraints imposed by a geometric envelope available. Where the geometric envelope is determined by the engine component being manufactured, the location in the engine of the engine component, the materials used, or any other design constraint. The PAF enables the manufacturing of a high performing airfoil with peak performance with the factors available. While narrowing these multiple factors to a region of possibilities saves time, money, and resources, the largest benefit is producing a superior performing airfoil. Previously developed airfoils may peak in one area of performance by design, but lose efficiency or lifetime benefits in another area of performance. In other words, the performance area factor enables the development and production of higher performing engine components across multiple areas of performance with available constraints.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An engine component for a gas turbine engine, the engine component comprising a cooling architecture comprising at least one unit cell having a set of walls with a thickness, the set of walls defining fluidly separate conduits having multiple openings, each of the multiple openings having a hydraulic diameter; wherein the thickness (t) and the hydraulic diameter ($D_H$) relate to each other by an equation:

$$\frac{(D_H + 2t)^2}{((D_H + 2t)/D_H)^{1/3}}$$

to define a performance area factor (PAF); and wherein the PAF is greater than or equal to 4.5 mm² and less than or equal to 625 mm² (4.5 mm²≤PAF≤625 mm²).

The engine component of any preceding clause wherein the cooling architecture is disposed within a wall gap of the engine component, the wall gap located between an outer wall facing a hot gas flow and an inner wall facing a cooling fluid flow.

The engine component of any preceding clause wherein the fluidly separate conduits define a furcated flow path.

The engine component of any preceding clause wherein the at least one unit cell is multiple unit cells.

The engine component of any preceding clause wherein the multiple unit cells are stacked together to define the cooling architecture.

The engine component of any preceding clause wherein the multiple openings fluidly connect consecutive unit cells to further define the fluidly separate conduits.

The engine component of any preceding clause wherein the performance area factor (PAF) is less than or equal to 85 mm² (4.50 mm²≤PAF≤85 mm²).

The engine component of any preceding clause wherein the thickness (t) is greater than or equal to 0.05 mm and less than or equal to 10 mm (0.05 mm≤t≤10 mm).

The engine component of any preceding clause wherein the thickness (t) is greater than or equal to 0.75 mm and less than or equal to 6 mm (0.75 mm≤t≤6 mm).

The engine component of any preceding clause wherein the diameter ($D_H$) is greater than or equal to 0.25 mm and less than or equal to 10 mm (0.25 mm≤t≤10 mm).

The engine component of any preceding clause wherein the diameter (D) is greater than or equal to 0.5 mm and less than or equal to 2 mm (0.5 mm≤D≤2 mm).

The engine component of any preceding clause wherein the denominator of the equation for PAF is greater than or equal to 1.0 and less than or equal to 1.5 (1≤$F_p$≤1.5) and is proportional to an amount of influence of friction on an amount of pressure drop ($F_p$).

A cooling architecture for an engine component, the cooling architecture comprising a set of unit cells having a set of walls with a thickness (t), the set of walls defining fluidly separate conduits having a set of openings with a hydraulic diameter ($D_H$); wherein an amount of influence of friction on an amount of pressure drop ($F_p$) is proportional to $$((D + 2t)/D)^{1/3}$$

which is greater than or equal to 1.0 and less than or equal to 1.5 (1≤$F_p$≤1.5).

The cooling architecture of any preceding clause wherein the cooling architecture is disposed within a wall gap of the engine component, the wall gap located between an outer wall facing a hot gas flow and an inner wall facing a cooling fluid flow.

The cooling architecture of any preceding clause wherein the set of unit cells is multiple unit cells stacked together to define the cooling architecture.

The cooling architecture of any preceding clause wherein the set of openings fluidly connect consecutive unit cells to further define the fluidly separate conduits.

The cooling architecture of any preceding clause wherein the fluidly separate conduits define a furcated flow path.

The cooling architecture of any preceding clause wherein an amount of heat transfer area (HTA) is proportional to (D+2t)² and wherein a performance area factor (PAF) is equal to $$\frac{Q_a}{F_p}$$

and the performance area factor (PAF) is greater than or equal to 4.5 mm² and less than or equal to 625 mm² (4.5 mm²≤PAF≤625 mm²).

The cooling architecture of any preceding clause wherein the performance area factor (PAF) is less than or equal to 85 mm² (4.50 mm²≤PAF≤85 mm²).

A method of forming an engine component, the method comprising: forming at least one unit cell with a wall having a thickness (t); forming a flow path extending through the at least one unit cell, the flow path having a hydraulic diameter (D); determining a performance area factor (PAF) equal to:

$$\frac{(D+2t)^2}{\left((D+2t)/D\right)^{1/3}};$$

manufacturing the at least one unit cell with a performance area factor (PAF) greater than or equal to 4.5 mm² and less than or equal to 625 mm² (4.5 mm²≤PAF≤625 mm²).

The cooling architecture of any preceding clause wherein the denominator of the equation for PAF is greater than or equal to 1.0 and less than or equal to 1.5 ($1 \leq F_p \leq 1.5$) and is proportional to an amount of friction on pressure drop ($F_p$).

We claim:

1. An engine component for a gas turbine engine, the engine component comprising:
    a cooling architecture comprising at least one unit cell having a set of walls with a thickness (t), the set of walls fluidly separating the at least one unit cell into a first set of conduits and a second set of conduits, each of the first and second set of conduits defining a furcated flow path and having multiple openings, each of the multiple openings having a hydraulic diameter ($D_H$);
    wherein the thickness (t) and the hydraulic diameter ($D_H$) relate to each other by an equation:

$$\frac{(D_H+2t)^2}{\left((D_H+2t)/D_H\right)^{1/3}}$$

to define a performance area factor (PAF); and
    wherein the PAF is greater than or equal to 4.5 mm² and less than or equal to 625 mm² (4.5 mm²≤PAF≤625 mm²).

2. The engine component of claim 1 wherein the cooling architecture is disposed within a wall gap of the engine component, the wall gap located between an outer wall facing a hot gas flow and an inner wall facing a cooling fluid flow.

3. The engine component of claim 1 wherein the at least one unit cell is multiple unit cells.

4. The engine component of claim 3 wherein the multiple unit cells are stacked together to define the cooling architecture.

5. The engine component of claim 4 wherein the multiple openings fluidly connect consecutive unit cells to further define the fluidly separate conduits.

6. The engine component of claim 1 wherein the performance area factor (PAF) is less than or equal to 85 mm² (4.50 mm²≤PAF≤85 mm²).

7. The engine component of claim 1 wherein the thickness (t) is greater than or equal to 0.05 mm and less than or equal to 10 mm (0.05 mm≤t≤10 mm).

8. The engine component of claim 1 wherein the diameter ($D_H$) is greater than or equal to 0.75 mm and less than or equal to 6 mm (0.75 mm≤$D_H$≤6 mm).

9. The engine component of claim 1 wherein the diameter ($D_H$) is greater than or equal to 0.25 mm and less than or equal to 10 mm (0.25 mm≤$D_H$≤10 mm).

10. The engine component of claim 1 wherein the thickness (t) is greater than or equal to 0.5 mm and less than or equal to 2 mm (0.5 mm≤t≤2 mm).

11. The engine component of claim 1 wherein the denominator of the equation for PAF is greater than or equal to 1.0 and less than or equal to 1.5 ($1 \leq F_p \leq 1.5$) and is proportional to an amount of influence of friction on an amount of pressure drop ($F_p$).

12. A cooling architecture for an engine component, the cooling architecture comprising:
    a set of unit cells having a set of walls with a thickness (t), the set of walls fluidly separating each unit cell in the set of unit cells into a first set of conduits and a second set of conduits, each of the first and second set of conduits defining a furcated flow path and having a set of openings with a hydraulic diameter ($D_H$);
    wherein an amount of influence of friction on an amount of pressure drop ($F_p$) is proportional to $$\left(\frac{(D_H+2t)}{D_H}\right)^{1/3}$$

which is greater than or equal to 1.0 and less than or equal to 1.5 ($1 \leq F_p \leq 1.5$).

13. The cooling architecture of claim 12 wherein the cooling architecture is disposed within a wall gap of the engine component, the wall gap located between an outer wall facing a hot gas flow and an inner wall facing a cooling fluid flow.

14. The cooling architecture of claim 12 wherein the set of unit cells is multiple unit cells stacked together to define the cooling architecture.

15. The cooling architecture of claim 14 wherein the set of openings fluidly connect consecutive unit cells to further define the fluidly separate conduits.

16. The cooling architecture of claim 12 wherein an amount of heat transfer area (HTA) is proportional to $(D_H+2t)^2$ and wherein a performance area factor (PAF) is equal to $$\frac{HTA}{F_p}$$

and the performance area factor (PAF) is greater than or equal to 4.5 mm² and less than or equal to 625 mm² (4.5 mm²≤PAF≤625 mm²).

17. The cooling architecture of claim 16 wherein the performance area factor (PAF) is greater than or equal to 4.5 mm² and less than or equal to 85 mm² (4.5 mm²≤PAF≤85 mm²).

18. A method of forming an engine component, the method comprising:
    forming at least one unit cell with a wall having a thickness (t);
    forming at least two fluidly separate conduits separated by the wall;
    forming a furcated flow path in each of the at least two fluidly separate conduits, the furcated flow path extending through the at least one unit cell, the furcated flow path having a hydraulic diameter ($D_H$);

determining a performance area factor (PAF) equal to:

$$\frac{(D_H + 2t)^2}{\left(\frac{(D_H + 2t)}{D_H}\right)^{1/3}};$$

manufacturing the at least one unit cell with the performance area factor (PAF) greater than or equal to 4.5 mm² and less than or equal to 625 mm² (4.5 mm²≤PAF≤625 mm²).

* * * * *